(12) United States Patent  (10) Patent No.: US 8,528,487 B2
Shapery  (45) Date of Patent: Sep. 10, 2013

(54) SYSTEM AND METHOD FOR OPERATING A VEHICLE IN MULTIPLE TRANSPORTATION NETWORKS

(75) Inventor: Sandor Wayne Shapery, San Diego, CA (US)

(73) Assignee: Sandor Wayne Shapery Wayne Shapery, San Diego, CA (US)

( * ) Notice: Subject to any disclaimer, the term of this patent is extended or adjusted under 35 U.S.C. 154(b) by 90 days.

(21) Appl. No.: 13/018,215

(22) Filed: Jan. 31, 2011

(65) Prior Publication Data

US 2011/0184601 A1 Jul. 28, 2011

Related U.S. Application Data

(63) Continuation-in-part of application No. 12/184,524, filed on Aug. 1, 2008, now Pat. No. 8,069,792.

(60) Provisional application No. 60/953,404, filed on Aug. 1, 2007.

(51) Int. Cl.
  *B60L 13/00* (2006.01)
  *B60M 1/30* (2006.01)
(52) U.S. Cl.
  USPC .................................. 104/287; 191/22 R
(58) Field of Classification Search
  USPC ............ 104/287, 289, 291, 292; 191/22 R, 191/29 R, 29 DM, 33 R, 35, 36, 22 C
  See application file for complete search history.

(56) References Cited

U.S. PATENT DOCUMENTS

| | | | |
|---|---|---|---|
| 3,569,804 A | 3/1971 | Studer | |
| 3,594,622 A | 7/1971 | Inagaki | |
| 3,641,939 A | 2/1972 | Remy | |
| 3,694,041 A | 9/1972 | Studer | |
| 3,706,922 A | 12/1972 | Inagaki | |
| 3,797,402 A | 3/1974 | Karch | |
| 3,845,720 A | 11/1974 | Bohn et al. | |
| 3,847,089 A | 11/1974 | Nelson | |
| 3,911,828 A | 10/1975 | Schwarzler | |
| 4,092,554 A * | 5/1978 | Quinn | 104/292 |
| 4,315,197 A | 2/1982 | Studer | |
| 4,324,185 A | 4/1982 | Vinson | |
| 5,009,865 A | 4/1991 | Boden et al. | |
| 5,757,098 A | 5/1998 | Higuchi et al. | |
| 5,923,109 A | 7/1999 | Higuchi et al. | |
| 5,959,382 A | 9/1999 | Dauwalter | |
| 6,268,673 B1 | 7/2001 | Shah et al. | |
| 6,396,178 B1 | 5/2002 | Chiu | |
| 6,612,245 B2 * | 9/2003 | Kumar et al. | 105/26.05 |
| 6,977,451 B2 | 12/2005 | Onishi | |
| 2006/0113848 A1 | 6/2006 | Studer | |
| 2008/0223249 A1 | 9/2008 | Studer | |

* cited by examiner

*Primary Examiner* — R. J. McCarry, Jr.
(74) *Attorney, Agent, or Firm* — Knobbe Martens Olson & Bear LLP

(57) ABSTRACT

A system and method for operating a vehicle in multiple zones is disclosed. In one aspect, there is a vehicle for transporting a load comprising an energy storage device configured to receive and store energy originating from at least one of a power source and a linear motor and a motor configured to move the vehicle using energy delivered from the power source when energy from the power source is available for delivery, and further configured to move the vehicle using the energy stored in the energy storage device when the energy from the power source is unavailable for delivery, wherein the power source is located external to the vehicle and is stationary when the vehicle is in motion.

26 Claims, 7 Drawing Sheets

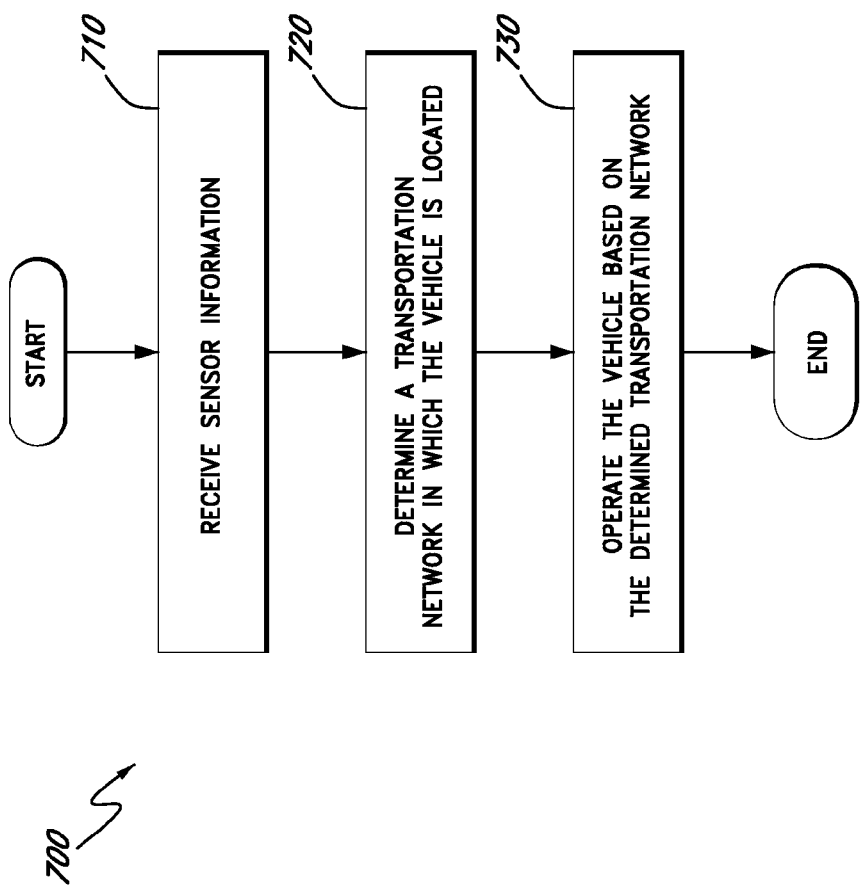

SYSTEM AND METHOD FOR OPERATING A VEHICLE IN MULTIPLE TRANSPORTATION NETWORKS

CROSS-REFERENCE TO RELATED APPLICATIONS

This application is a continuation-in-part of U.S. patent application Ser. No. 12/184,524, filed Aug. 1, 2008, which claims priority to U.S. Provisional Patent Application No. 60/953,404, filed Aug. 1, 2007, which are both hereby incorporated by reference in their entireties.

BACKGROUND

1. Field

The present invention generally relates to systems and methods for transporting loads.

2. Background

Transportation of loads, such as passengers and/or goods, is vital to any economy. Various modes of transportation exist and vehicles are designed to travel across various infrastructure systems. As demand for faster and more efficient transportation grows, there exists a need for a vehicle capable of utilizing various infrastructure systems.

SUMMARY

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description" one will understand how the features of this invention provide advantages such as a vehicle capable of transporting of passengers and/or loads across varied systems.

In one aspect, a vehicle for transporting a load is provided. The vehicle comprises an energy storage device configured to receive and store energy originating from at least one of a power source and a linear motor. The vehicle further comprises a motor configured to move the vehicle using energy delivered from the power source when energy from the power source is available for delivery. The motor is further configured to move the vehicle using the energy stored in the energy storage device when the energy from the power source is unavailable for delivery. The power source is located external to the vehicle and is stationary when the vehicle is in motion.

In another aspect, a method of operating a vehicle for transporting a load is provided. The method comprises receiving and storing energy originating from at least one of a power source and a linear motor. The method further comprises moving the vehicle using energy delivered from the power source when energy from the power source is available for delivery. The method further comprises moving the vehicle using the energy stored in the energy storage device when the energy from the power source is unavailable for delivery. The power source is located is located external to the vehicle and is stationary when the vehicle is in motion.

In another aspect, an apparatus for transporting a load is provided. The apparatus comprises means for storing energy originating from at least one of a power source and a linear motor. The apparatus further comprises means for moving a vehicle using energy delivered from the power source when energy from the power source is available for delivery. The apparatus further comprises means for moving the vehicle using the energy stored in the energy storage device when the energy from the power source is unavailable for delivery. The power source is located external to the vehicle and is stationary when the vehicle is in motion.

In another aspect, a method of making a vehicle for transporting a load is provided. The method comprises providing an energy storage device in a vehicle. The energy storage device is configured to receive and store energy originating from at least one of a power source and a linear motor. The method further comprises providing a motor in the vehicle. The motor is configured to move the vehicle using energy delivered from the power source when energy from the power source is available for delivery, and further configured to move the vehicle using the energy stored in the energy storage device when the energy from the power source is unavailable for delivery, wherein the power source is located external to the vehicle and is stationary when the vehicle is in motion.

BRIEF DESCRIPTION OF THE DRAWINGS

FIG. 7 is a flowchart illustrating a method of determining a zone in which a vehicle is operating.

DETAILED DESCRIPTION

The following detailed description is directed to certain specific embodiments of the invention. However, the invention may be embodied in a multitude of different ways as defined and covered by the claims. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Similarly, methods disclosed herein may be performed by one or more computer processors configured to execute instructions retrieved from a computer-readable storage medium. A computer-readable storage medium stores information, such as data or instructions, for some interval of time, such that the information may be read by a computer during that interval of time. Examples of computer-readable storage media are memory, such as random access memory (RAM), and storage, such as hard drives, optical discs, flash memory, floppy disks, magnetic tape, paper tape, and punch cards. In this description, reference is made to the drawings wherein like parts are designated with like numerals throughout.

Figure 1:
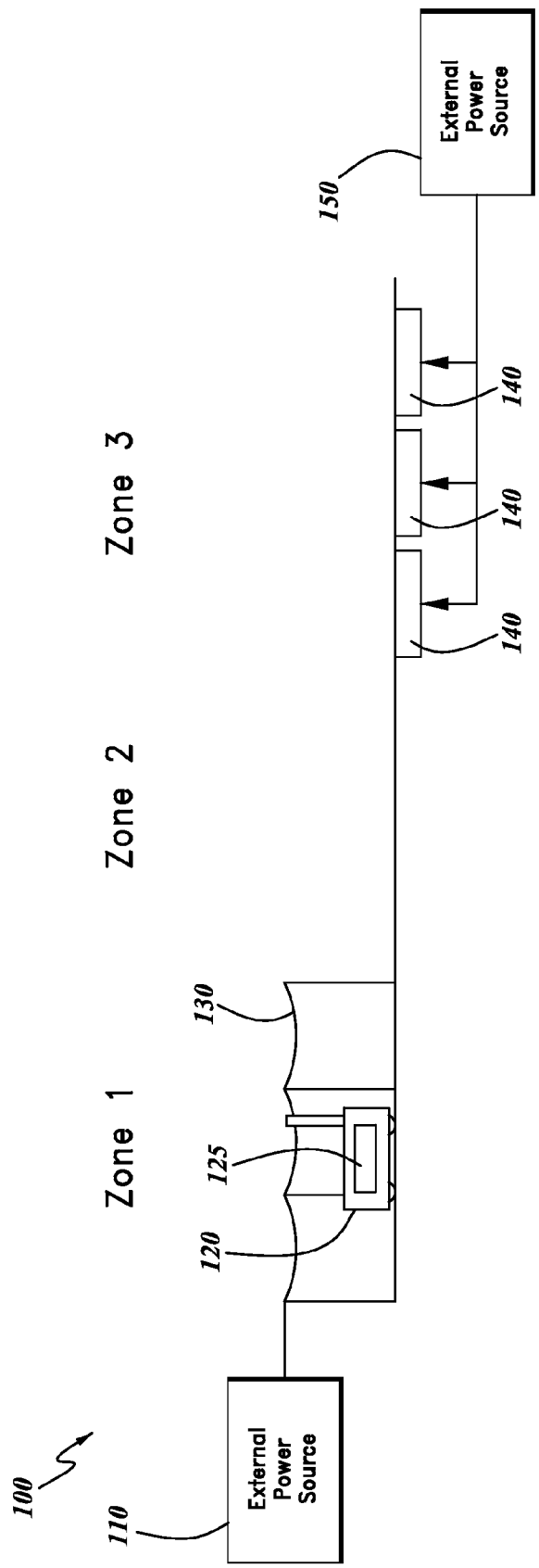
FIG. 1 is an illustration of an exemplary system for transportation.

FIG. 1 is an illustration of an exemplary system for transportation 100. The system for transportation 100 may comprise a vehicle 120 that can carry a load, such as passengers and/or goods, along a path 160. The vehicle 120 may comprise, for example, a tram, a trolley, a train, a streetcar, and a railcar. The path 160 may be at least partially dynamic and/or at least partially predetermined. For example, the path 160 may comprise at least one of a street, a road, a highway, a thoroughfare, and a rail track.

The system for transportation 100 may be divided into one or more different zones. FIG. 1 depicts a system for transportation 100 comprising three different zones labeled Zone 1, Zone 2, and Zone 3, respectively. Zone 1 is a catenary transportation network comprising at least a portion of a path 160, such as a street and/or a rail track, and a conductor 130 for providing power from an external power source 110. When the vehicle 120 is in Zone 1, the vehicle 120 may move along the path 160 using power received via the conductor 130 from the external power source 110. Zone 1 may comprise overhead lines, such as a catenary system, and/or a third rail for conducting power from the external power source 110. Zone 2 is a free or unpowered transportation network comprising at least a portion of a path 160, such as a street and/or a rail track, and lacking a conductor for providing power from an external power source for generating motive forces using power from an external power source. When the vehicle is in Zone 2, the vehicle 120 may move along the path 160 using electrical power from an internal power source 125. The internal power source may be, for example, a capacitor and/or a battery. It is to be appreciated that Zone 2 may comprise a conductor which does not provide power or generate motive forces, such as a rail and/or an unpowered catenary system. Zone 3 is a magnetic transportation network comprising at least a portion of a path 160, such as a street and/or a rail track, and one or more conductors 140 for generating motive forces using power from an external power source 150. When the vehicle 120 is in Zone 3, the vehicle 120 may be passively moved along the path 160 by the generated forces, external to the vehicle, such as those generated by at least a portion of a linear motor.

Although FIG. 1 depicts three zones in a particular order, zones may be arranged in any order. For example, in some embodiments, a Zone 3 may follow a Zone 1, and a Zone 2 may follow a Zone 3. In some embodiments, the system for transportation 100 may comprise less than three zones. In other embodiments, the system for transportation 100 may comprise more than three zones. In some embodiments, a zone may comprise multiple noncontiguous segments. For example, in some embodiments, a portion of Zone 1 may be followed by a portion of Zone 2 which may be followed by Zone 3. Zone 3 may be followed by another portion of Zone 2 which may be followed by another portion of Zone 1.

As mentioned above, when the vehicle 120 is in Zone 1, the vehicle 120 may move along the path 160 using power received from an external power source 110. The external power source 110 may comprise an electric power plant and/or electric generator. The external power source 110 may be external to the vehicle and remain stationary while the vehicle moves. The vehicle 120 may convert the received power into motion along the path 160 using a motor. The vehicle 120 may also use the received power to operate additional systems, such as lighting and/or air conditioning. The vehicle 120 may store the received power in an internal power source 125, such as a capacitor.

The vehicle 120 may receive the power from the external power source 110 via at least a conductor 130 located in Zone 1. The vehicle 120 may connect to the conductor 130 to receive electrical power from the external power source 110 via the conductor 130. The conductor 130 may be connected to the external power source 110. For example, the conductor 130 may be connected to the external power source 110 via an electric power grid.

The conductor 130 may comprise a system of overhead lines and/or wires, such as a catenary system. The conductor 130 may comprise a third rail. When in Zone 1, the vehicle 120 may move below, above, or beside the conductor 130 along the path 160. For example, if the conductor 130 comprises a catenary system, the vehicle 120 may move below the conductor 130 along the path 160. If the conductor 130 comprises a third rail, the vehicle 120 may move above or beside the conductor 130 along the path 160.

When the vehicle 120 is in Zone 2, the vehicle 120 may not receive power from an external power source. In particular, Zone 2 may not comprise a conductor connected to an external power source. Thus, as noted above, when the vehicle 120 is in Zone 2, the vehicle 120 may move along the path 160 using electrical power from an internal power source 125. The internal power source 125 may comprise a battery, a capacitor, an ultracapacitor, and/or any device capable of storing electrical energy and/or power. The internal power source 125 may comprise an internal combustion engine, an electric generator, a solar panel, a fuel cell, flywheel and/or any device capable of generating and/or storing energy and/or power. The vehicle 120 may convert the power from the internal power source 125 into motion along the path 160 using a motor. The vehicle 120 may also use the power from the internal power source 125 to operate additional systems, such as lighting and/or air conditioning.

As noted above, when the vehicle 120 is in Zone 3, the vehicle 120 may be passively moved along the path 160 by external forces. The external forces may be generated using power from an external power source 150. The external power source 150 may comprise an electric power plant and/or electric generator. In one embodiment, the vehicle 120 is passively moved along the path 160 by external forces generated by a conductor 140 located in Zone 3. The conductor 140 may be connected to the external power source 150. For example, the conductor 140 may be connected to the external power source 150 via an electric power grid.

The conductor 140 may comprise one or more coils as part of a linear motor system. When the vehicle 120 is in Zone 3, the external power source 150 may be used to generate a current in one or more of the coils, thereby generating a magnetic flux. The magnetic flux may interact with a conductor and/or a source of magnetic flux of the vehicle 120 to generate force that move the vehicle 120 along the path 160.

As mentioned above, in one embodiment, the conductor 140 comprises one or more coils. In one embodiment, the conductor 140 is at least partially embedded within the path 160. For example, one or more coils may be embedded within a street. When in Zone 3, the vehicle 120 may move above conductor 140 along the path 160.

When in Zone 3, the vehicle 120 may convert motion of the vehicle into electrical power. The electrical power may be used to operate additional systems, such as lighting and/or air conditioning. The electrical power may be stored in the internal power source 125. When in Zone 3, the vehicle may also produce electric power for storage and/or operation of additional systems as a result of traveling downhill, where the downhill momentum of the vehicle is converted as the result of the linear motor functioning as an electric generator.

As noted above, the vehicle 120 may be passively moved along the path by forces generated by at least a portion of a linear motor. The vehicle 120 may also be passively moved along the path 160 by gravity if, for example, the path 160 comprises a downhill portion.

Figure 2:
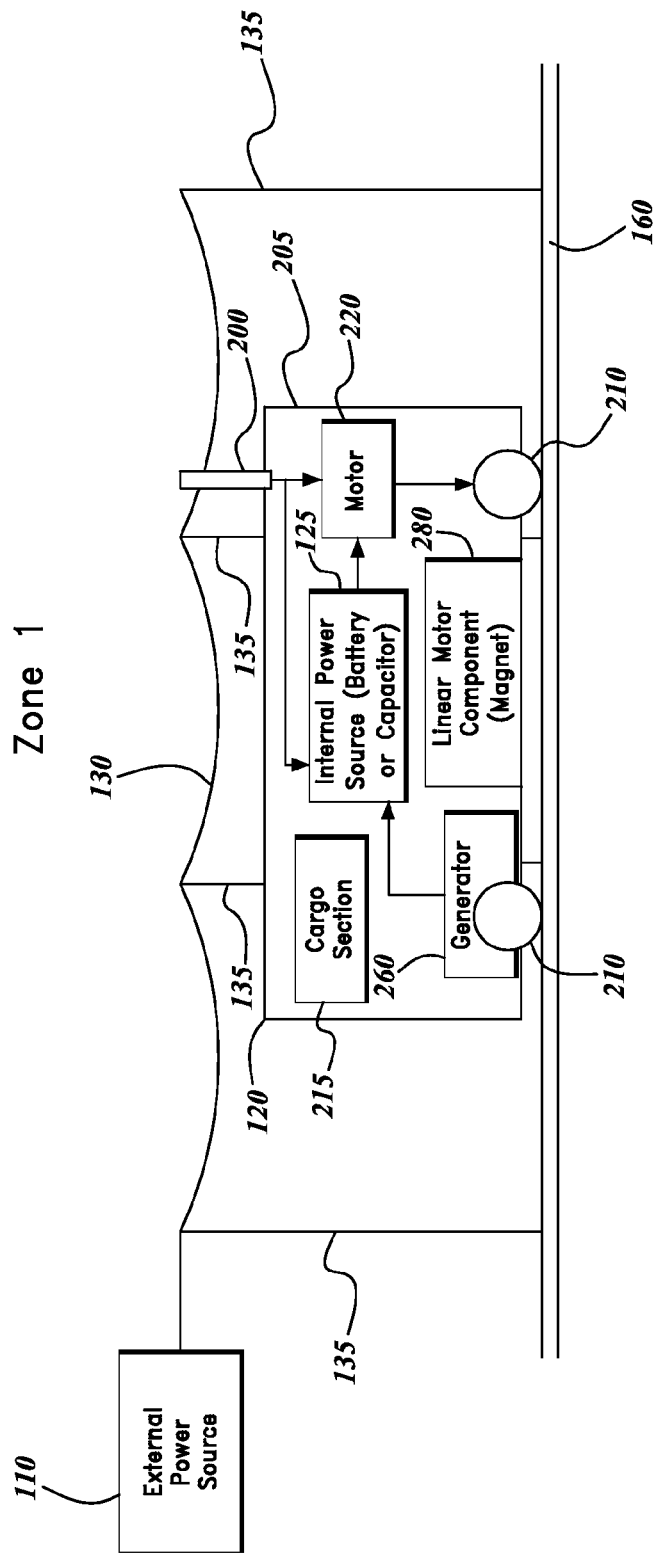
FIG. 2 is a functional block diagram of an exemplary vehicle operating in a catenary transportation network (Zone 1).

FIG. 2 is a functional block diagram of an exemplary vehicle 120 operating in a catenary transportation network (Zone 1). As mentioned above, Zone 1 is a transportation network comprising at least a portion of a path 160, such as a street and/or a rail track, and a conductor 130 for providing power from an external power source 110. The vehicle 120 may comprise a body 205 situated on a plurality of wheels 210 which travel along the path 160. The body 205 may comprise a cargo section 215 for carrying a load, such as passengers and/or goods. Housed within the body 205, the vehicle may comprise a motor 220 configured to provide motive forces to the wheels 210. The vehicle 120 may comprise a generator 260 configured to convert motion of the wheels 210 into electrical energy. The generator may be at least partially housed within the body 205 and/or at least partially positioned outside of the body 205 and in contact with the wheels 210. The vehicle may comprise an internal power source 125, such as a capacitor, battery, flywheel and/or fuel cell housed within the body 205 and configured to store energy from the generator 260 and provided energy to the motor 220. As described above, when the vehicle 120 is in Zone 1, the vehicle 120 may move along the path 160 using power received from an external power source 110. The vehicle 120 may connect to the external power source via at least the conductor 130 and a conductive current collector 200 attached to the vehicle 120 and configured to provide energy from the external power source 110 to the motor 220 and the internal power source 125. The current collector 200 may comprise at least a portion that extends outside of the body 205. The vehicle 120 may also comprise at least one linear motor element 280 positioned at a lower portion of or beneath the body 205.

In one embodiment, the conductor 130 comprises a system of overhead lines and/or wires, such as a catenary system, supported by one or more posts 135. The current collector 200 may comprise at least a portion that vertically extends above the body 205 a distance sufficient to contact the conductor 130. For example, the current collector 200 may comprise a pantograph, a bow collector, and/or a trolley pole. In one embodiment, the conductor 130 comprises a third rail. The current collector 200 may comprise at least portion that horizontally extends from the body 205 or vertically extends beneath the body 205 a distance sufficient to contact the conductor 130. For example, the current collector 200 may comprise a metal contact block referred to as a shoe.

As mentioned above, the vehicle 120 may comprise a motor 220 housed within the body 205. The motor 220 may be an electric motor and may be powered by electric power transferred to the vehicle 120 from the external power source 110 via the conductor 130 and the current collector 200. The motor 220 may provide motive forces to the wheels 210, moving the vehicle 120 along the path 160.

As also mentioned above, the vehicle may also comprise an internal power source 125 housed within the body 205. The internal power source 125 may comprise at least one of a battery, a fuel cell, an electrostatic capacitor, an electrolytic capacitor, a supercapacitor, an ultracapacitor, an electrochemical double layer (ECDL) capacitor, and/or any device capable of storing electrical power. In one embodiment, the internal power source 125 may, for example, have an energy density of between 0.5 and 30 Wh/kg. In one embodiment, the internal power source 125 may, for example, have an energy density between 1 and 10 Wh/kg. In one embodiment, the internal power source 125 may, for example, have a power density between 1 and 10 kW/kg. The internal power source 125 may comprise at least one of an internal combustion engine, an electric generator, a solar panel, and/or any device capable of generating power.

The internal power source 125 may be coupled to the current collector 200. Thus, the internal power source 125 may store energy transferred to the vehicle 120 from the external power source 110 via the conductor 130 and current collector 200. The internal power source 125 may be coupled to the motor 220. Thus, the internal power source 125 may smooth out power spikes and/or dips that occur in the amount of power received from the external power source 110. The internal power source 125 may also power the motor 220 when the power is unavailable for delivery to vehicle 120. For example, the internal power source 125 may power the motor 220 if the conductor 130 is not receiving power from the external power source 110. The internal power source 125 may be coupled to and power additional systems (not shown) such as lighting and/or air conditioning. The internal power source 125 may be coupled to a generator 260. The generator 260 may convert motion of the vehicle 120 into electrical energy to be stored in the internal power source 125. In one embodiment, the generator 260 converts motion of the wheels 210 into electrical energy to be stored in the internal power source 125.

The vehicle 120 may also comprise at least one linear motor element 280 positioned beneath the body 205. The linear motor element 280 may comprise at least one of a conductor and a source of magnetic flux. As described below, the linear motor element 280 may be used in conjunction with other linear motor elements to move the vehicle 120 along the path 160.

Figure 3:
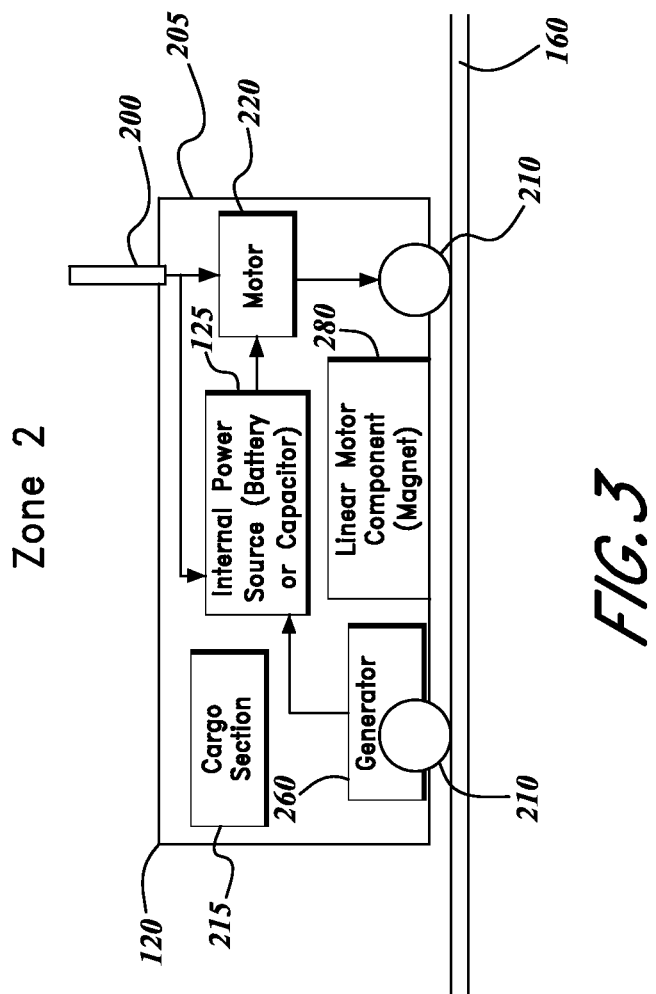
FIG. 3 is a functional block diagram of the vehicle of FIG. 2 operating in a free or unpowered transportation network (Zone 2).

FIG. 3 is a functional block diagram of the vehicle of FIG. 2 operating in a free or unpowered transportation network (Zone 2). As shown in FIG. 3, the vehicle 120 comprises substantially the same functional blocks, arranged in substantially the same manner, as the vehicle 120 described above with respect to FIG. 2. As described above, Zone 2 is a transportation network comprising at least a portion of a path 160, such as a street and/or a rail track, and lacking a conductor for providing power from an external power source for generating force using power from an external power source 150. Thus, as also described above, when the vehicle 120 is in Zone 2, the vehicle 120 may not receive power from an external power source or be moved by external forces. Rather, when the vehicle 120 is in Zone 2, the vehicle 120 may move along the path 160 using power from the internal power source 125. This allows the vehicle 120 to move, for example, in between sections without a connection to an external power supply and/or in sections in which the connection to the external power supply is nonfunctional. In one embodiment, the internal power source 125 may store and/or generate enough energy to move the vehicle 120 several miles.

Figure 4:
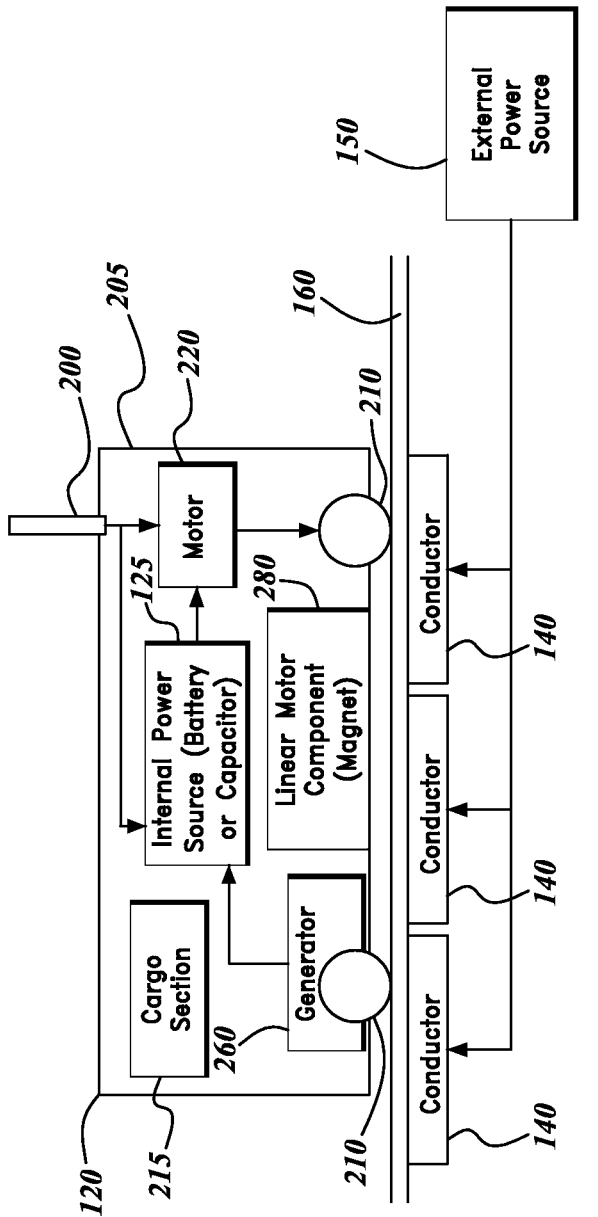
FIG. 4 is a functional block diagram of the vehicle of FIG. 2 operating in a magnetic transportation network (Zone 3).

FIG. 4 is a functional block diagram of the vehicle of FIG. 2 operating in a magnetic transportation network (Zone 3). As shown in FIG. 4, the vehicle 120 comprises substantially the same functional blocks, arranged in substantially the same manner, as the vehicle 120 described above with respect to FIG. 2. As described above, Zone 3 is a transportation network comprising at least a portion of a path 160, such as a street and/or a rail track, and one or more conductors 140 for generating motive forces using power from an external power source 150. The conductors 140 may, therefore, be connected to the external power source 150. As also described above, when the vehicle 120 is in Zone 3, the vehicle 120 may not receive power from the external power source 150. Rather, when the vehicle 120 is in Zone 3, the vehicle 120 may be passively moved along the path 160 by forces external to the vehicle 120. The external forces may be generated by gravity and/or by using power from the external power source 150. In one embodiment, the vehicle 120 is passively moved along the path 160 by external forces generated by the conductors 140.

The conductors 140 may comprise at least one linear motor element, such as one or more coils. When the vehicle 120 is in Zone 3, the external power source 150 may be used to generate a current in one or more of the coils, thereby generating a magnetic flux. The magnetic flux may interact with the linear motor element 280 attached the vehicle 120 to generate motive forces that moves the vehicle 120 along the path 160.

The linear motor element 280 attached to the vehicle 120 may comprise at least one of a conductor and a source of magnetic flux. The linear motor element 280 may comprise, for example, plate formed of a magnetizable material, such as steel. The linear motor element 280 may comprise one or more magnets. For example, the linear motor element 280 may comprise at least one of a permanent magnet and an electromagnet. Permanent magnets may comprise rare earth magnets, samarium-cobalt magnets, alnico magnets, and neodymium magnets. In one embodiment, the linear motor element 280 comprises an electromagnet that is powered by the internal power source 125.

Figure 5:
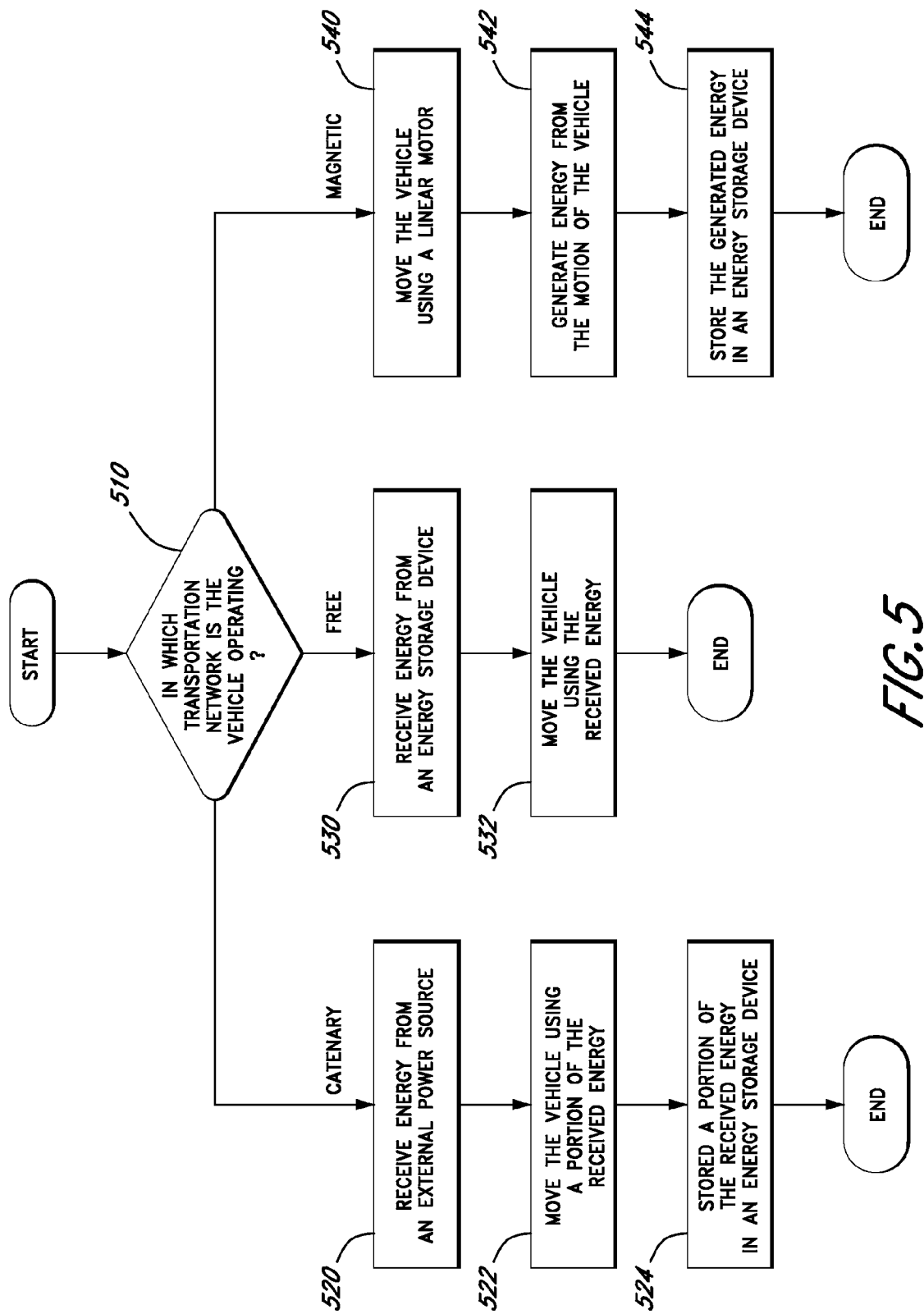
FIG. 5 is a flowchart illustrating a method of operating a vehicle

FIG. 5 is a flowchart illustrating a method 500 of operating a vehicle. The method 500 may be performed, for example, to operate the vehicle 120 of FIGS. 2-4. The method 500 begins in block 510 with the determination of a zone in which the vehicle is operating.

If it is determined, in block 510, that the vehicle is operating in a catenary transportation network, the method continues to block 520. A catenary transportation network may be a zone in which energy is available for delivery from an external power source. For example, the catenary transportation network may comprise overhead lines, such as a catenary system. As another example, the catenary transportation network may comprise a third rail.

In block 520, energy is received from an external power source. The energy may be received, for example, by the vehicle 120 of FIG. 2. The energy may be received via a current collector, such as the current collector 200 of FIG. 2. The method continues to block 522 where the vehicle is moved using at least a portion of the received energy. The vehicle may be moved, for example, by the motor 220 of FIG. 2. The motor may convert a portion of the received energy into motion of the vehicle. The method also continues to block 524 where at least a portion of the received energy is stored in an energy storage device. The received energy may be stored, for example, in the internal power source 125 of FIG. 2.

If it is determined, in block 510, that the vehicle is operating in a free or unpowered transportation network, the method continues to block 530. A free or unpowered transportation network may be a zone in which energy is unavailable for delivery from an external power source. In a free or unpowered transportation network, the vehicle may also not be passively moved by external forces. For example, a free or unpowered transportation network may be located between two catenary transportation networks or between a catenary transportation network and a magnetic transportation network. A free or unpowered transportation network may also be a zone comprising overhead lines that are unpowered, for example, due to a power outage or malfunction.

In block 530, energy is received from an energy storage device, such as a capacitor, battery, fuel cell, and/or flywheel. The energy may be received, for example, by the motor 220 of FIG. 3. The method continues to block 532 where a vehicle is moved using the received energy. The vehicle may be moved, for example, by the motor 220 of FIG. 2. The motor may convert at least a portion of the received energy into motion of the vehicle.

If it is determined, in block 510, that the vehicle is operating in a magnetic transportation network, the method continues to block 540. A magnetic transportation network may be a zone in which the vehicle is moved by external forces. For example, a magnetic transportation network may comprise at least a portion of a linear motor which generates a force that moves the vehicle. A magnetic transportation network may also comprise a downhill portion.

In block 540, a vehicle is moved using a linear motor. For example, the vehicle may be moved by the linear motor comprising the linear motor component 280 and the conductors 140 of FIG. 4. The linear motor may be powered, at least in part, by an external power source, such as the external power source 150 of FIG. 4. The method continues to block 542 where energy is generated by the motion of the vehicle. The energy may be generated, for example, by the generator 260 of FIG. 4. In block 544, the generated energy is stored in an energy storage device, such as a capacitor, battery, and/or flywheel. The generated energy may be stored, for example, in the internal power source 125 of FIG. 2.

For example, a vehicle may travel over a magnetic transportation network for a distance, then over a free or unpowered transportation network using internally stored and/or generated power, then over a magnetic transportation network, etc., thus eliminating the need to have a continuous magnetic transportation network and reducing the cost of magnetic transportations networks.

Figure 6:
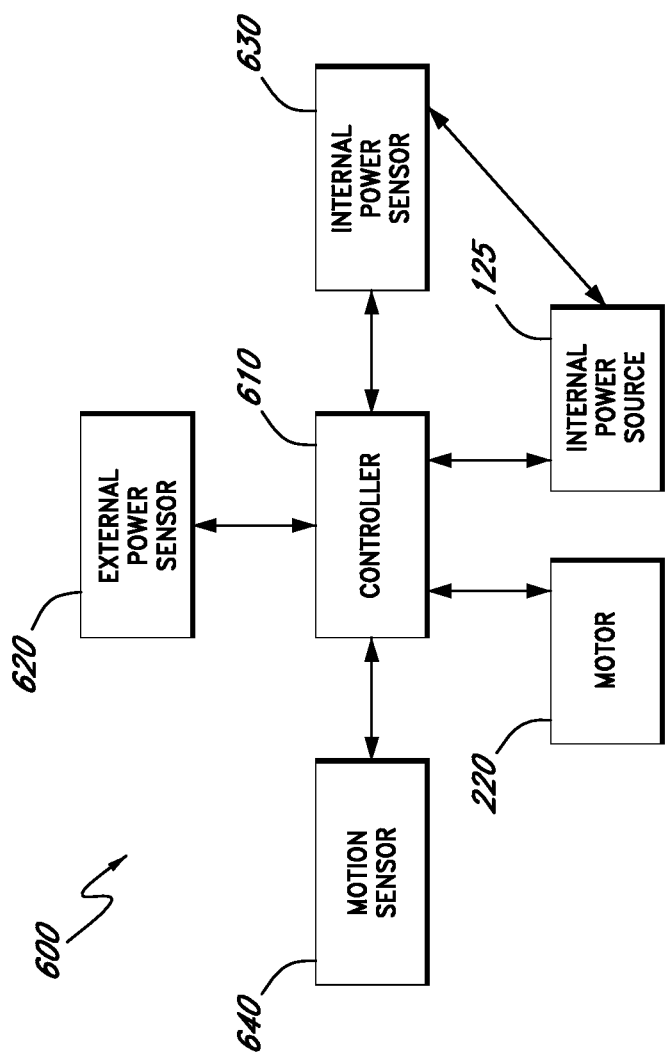
FIG. 6 is a functional block diagram of an exemplary control system.

The system of transportation 100 of FIG. 1 may comprise a control system to determine the type of transportation network in which the vehicle 125 is located. FIG. 6 is a functional block diagram of an exemplary control system 600. The control system 600 comprises a controller 610 coupled to an external power sensor 620, a motion sensor 630, and an internal power sensor 640.

The external power sensor 620 may provide the controller 610 with information regarding the amount of power being received from the external power source 110. In one embodiment, the external power sensor 620 is coupled to the current collector 200 of FIG. 2. The external power sensor 620 may determine the amount of power being received from the external power source 110 based on the amount of current flowing through the current collector 200.

The internal power sensor 630 may provide the controller 610 with information regarding the amount of power stored in and/or generated by the internal power source 125. The internal power sensor 630 may be coupled to the internal power source 125.

The motion sensor 640 may provide the controller 610 with information regarding motion of the vehicle 120. In one embodiment, the motion sensor 640 comprises at least one of an accelerometer and a global positioning system (GPS) sensor. In one embodiment, the motion sensor 640 is coupled to the generator 660 of FIG. 2. The motion sensor 640 may determine the motion of the vehicle 120 based on the amount of power generated by the generator 260.

The controller 610 may control the flow of power from the internal power source 125 to the motor 220 based on the information received from the sensors, as described below with respect to FIG. 7

FIG. 7 is a flowchart illustrating a method 700 of determining a transportation network in which a vehicle is located. The method 700 begins in block 710 with the reception of sensor information. The sensor information may be received, for example, by the controller 610 of FIG. 6. The sensor information may be received, for example, from at least one of the external power sensor 620, the internal power sensor 630, and the motion sensor 640 of FIG. 6.

In block 720, a transportation network in which the vehicle is located is determined. The determination may be performed, for example, by the controller 610 of FIG. 6. In another embodiment, the determination may be performed by a human operator or engineer.

In one embodiment, the control system 600 determines that energy from an external power source is available for deliver if at least a predetermined amount of current is flowing through the current collector 200 of FIG. 2. Thus, the control system 600 may determine that the vehicle is located in a catenary transportation network if at least a predetermined amount of current is flowing through the current collector 200. The control system 600 may determine that the vehicle is being moved by external forces if at least a predetermined amount of power is generated by the generator 260 of FIG. 4 and the motor 220 is not operating. The control system 600 may, thus, determine that the vehicle is located in a magnetic transportation network if at least a predetermined amount of power is generated by the generator 260 and the motor 220 is not operating. In one embodiment, if the control system 600 determines that it is not in a catenary transportation network or a magnetic transportation network, the control system 600 may determine that it is in a free or unpowered transportation network. In one embodiment, the control system 600 determines the transportation in which the vehicle is located based on its absolute location, as determined by the motion sensor 640, in reference to a database specifying the transportation network associated with a plurality of locations.

In block 730, the vehicle is operated based on the determined transportation network. For example, as described in detail above with respect to FIG. 5, if it is determined that the vehicle is located in a catenary transportation network, the vehicle may be moved using energy received from an external power source. If the vehicle is located in a free or unpowered transportation network, the vehicle may be moved using energy received from an energy storage device. If the vehicle is located in a magnetic transportation network, the vehicle may be moved by forces generated by a linear motor.

While the above description has pointed out novel features of the invention as applied to various embodiments, the skilled person will understand that various omissions, substitutions, and changes in the form and details of the device or process illustrated may be made without departing from the scope of the invention.

What is claimed is:

1. A vehicle for transporting a load, the vehicle comprising:
   an energy storage device configured to receive and store energy originating from a power source and a linear motor;
   a motor configured to move the vehicle when the power source is electrically connected to the motor and using energy delivered from the power source and further configured to move the vehicle using the energy stored in the energy storage device when the power source is not electrically connected to the motor, wherein the power source is located external to the vehicle and is stationary when the vehicle is in motion.

2. The vehicle of claim 1, wherein the energy storage device comprises at least one of a battery, a fuel cell, an electrostatic capacitor, an electrolytic capacitor, a supercapacitor, an ultracapacitor, an electrochemical double layer (ECDL) capacitor.

3. The vehicle of claim 1, further comprising a current collector configured to conduct energy from the power source to at least one of the energy storage device and the motor.

4. The vehicle of claim 3, wherein the current collector is configured to conduct energy from the power source via overhead lines.

5. The vehicle of claim 3, wherein the current collector comprises at least one of a pantograph, a bow collector, and a trolley pole.

6. The vehicle of claim 3, wherein the current collector is configured to conduct energy from the power source via a rail.

7. The vehicle of claim 1, further comprising a first linear motor component configured to interact with a second linear motor component to generate a force that moves the vehicle, wherein the second linear motor component is located external to the vehicle and stationary relative to the vehicle, wherein the first linear motor component comprises at least one of a conductor and a source of magnetic flux.

8. The vehicle of claim 1, further comprising a generator configured to convert motion of the vehicle into energy and provide the energy to the energy storage device.

9. The vehicle of claim 1, further comprising:
   a body; and
   a cargo section within the body configured to carry a load, wherein the load comprises at least one of passengers and goods.

10. The vehicle of claim 1, further comprising:
    one or more sensors configured to generate sensor information; and
    a controller configured to receive the sensor information and control the flow of power from the energy storage device to the motor based on the sensor information.

11. The vehicle of claim 1, wherein the power source is electrically connected to the motor via an overhead line.

12. The vehicle of claim 1, wherein the power source is electrically connected to the motor via a rail.

13. A method of operating a vehicle for transporting a load, the method comprising:
    receiving and storing energy originating from a power source and a linear motor;
    moving the vehicle when the power source is electrically connected to the motor and using energy delivered from the power source; and
    moving the vehicle using the energy stored in the energy storage device when the power source is not electrically connected to the motor, wherein the power source is located external to the vehicle and is stationary when the vehicle is in motion.

14. The method of claim 13, wherein the energy storage device comprises at least one of a battery, a fuel cell, an electrostatic capacitor, an electrolytic capacitor, a supercapacitor, an ultracapacitor, an electrochemical double layer (ECDL) capacitor.

15. The method of claim 13, further comprising conducting energy from the power source to at least one of the energy storage device and the motor.

16. The method of claim 15, wherein conducting energy comprises conducting energy from the power source via overhead lines.

17. The method of claim 13, further comprising moving the vehicle using a linear motor.

18. The method of claim 13, further comprising converting motion of the vehicle into energy and providing the energy to the energy storage device.

19. An apparatus for transporting a load, the apparatus comprising:
    means for storing energy originating from a power source and a linear motor; and
    means for moving a vehicle when the power source is electrically connected to the moving means and using energy delivered from the power source, and for moving the vehicle using the energy stored in the energy storage device when the power source is not electrically connected to the motor, wherein the power source is located external to the vehicle and is stationary when the vehicle is in motion.

20. The apparatus of claim 19, wherein the means for storing energy comprises at least one of a battery, a fuel cell, an electrostatic capacitor, an electrolytic capacitor, a supercapacitor, an ultracapacitor, an electrochemical double layer (ECDL) capacitor.

21. The apparatus of claim 19, further comprising means for conducting energy from the power source to at least one of the means for storing energy and the means for moving the vehicle.

22. The apparatus of claim 21, wherein the means for conducting comprises at least one of a pantograph, a bow collector, and a trolley pole.

23. The apparatus of claim 19, further comprising first means for interacting with a second means, wherein the interaction generates a force that moves the vehicle, wherein the second means is located external to the vehicle and stationary relative to the vehicle.

24. The apparatus of claim 23, wherein the first means for interacting with a second means comprises at least one of a conductor and a source of magnetic flux.

25. The apparatus of claim 19, further comprising means for converting motion of the vehicle into energy.

26. A method of making a vehicle for transporting a load, the method comprising:
providing an energy storage device in a vehicle, the energy storage device configured to receive and store energy originating from a power source and a linear motor; and
providing a motor in the vehicle, the motor configured to move the vehicle when the power source is electrically connected to the motor and using energy delivered from the power source, and further configured to move the vehicle using the energy stored in the energy storage device when the power source is not electrically connected to the motor, wherein the power source is located external to the vehicle and is stationary when the vehicle is in motion.

* * * * *